United States Patent [19]

Bartek et al.

[11] Patent Number: 4,797,381

[45] Date of Patent: Jan. 10, 1989

[54] PREPARATION OF ABRASION RESISTANT ALUMINA-SUPPORTED VANADIUM-ANTIMONY OXIDIC CATALYSTS

[75] Inventors: Joseph P. Bartek, Highland Heights; Andrew T. Guttmann, Maple Heights, both of Ohio

[73] Assignee: The Standard Oil Company, Cleveland, Ohio

[21] Appl. No.: 79,551

[22] Filed: Jul. 30, 1987

[51] Int. Cl.$^4$ .................. B01J 23/18; B01J 23/22; B01J 23/30; B01J 27/198

[52] U.S. Cl. .................... 502/202; 502/206; 502/209; 502/215; 502/302; 502/312; 502/324; 502/332; 502/335; 502/336; 502/341; 502/342; 502/344; 502/346; 502/348; 502/349; 502/351; 502/354

[58] Field of Search ............... 502/202, 206, 209, 215, 502/312, 354, 302, 324, 332, 335, 336, 341, 342, 344, 346, 351

[56] References Cited

U.S. PATENT DOCUMENTS

| | | | |
|---|---|---|---|
| 4,336,205 | 6/1982 | Onishi et al. | 502/312 X |
| 4,339,598 | 7/1982 | Guttmann et al. | 502/354 X |
| 4,405,498 | 9/1983 | Ebner | 502/209 X |

Primary Examiner—W. J. Shine
Attorney, Agent, or Firm—C. S. Lynch; D. J. Untener; L. W. Evans

[57] ABSTRACT

Disclosed is a method of making an active and abrasion resistant catalyst composition comprising at least 5 weight percent alumina support and at most 95 percent of a complex oxide composition having the empirical formula:

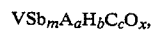

$$VSb_mA_aH_bC_cO_x,$$

where
A is one or more of W, Sn, Mo, B, P and Ge;
H is one or more of Cu, Ag, Nb, Ta, Ti, Fe, Co, Ni, Cr, Pb, Mn, Zn, Se, Te, Ga, In and As;
C is one or more of an alkali metal, alkaline earth metal, and rare earths; and where m is from 0.01 and up to 20; a is 0–10; b is 0–20; c is 0–20 (usually 0–1); the ratio (a+b+c):(1+m) is 0.01–6; wherein x is determined by the oxidation state of the other elements, which method comprises mixing a hydrosol or gel of boehmite with a slurry or solution containing the other batch materials containing the elements of said formula, and thereafter drying and calcining the resultant solid.

7 Claims, No Drawings

PREPARATION OF ABRASION RESISTANT ALUMINA-SUPPORTED VANADIUM-ANTIMONY OXIDIC CATALYSTS

This invention relates to a method of preparing abrasion resistant alumina-supported vanadium-antimony oxidic catalysts.

Catalysts containing vanadium and antimony in oxidized form, with and without other promoting elements, have been developed in the past. Such catalysts have been found to be useful, depending on their composition, for making unsaturated carboxylic acids and esters by condensing saturated acids or esters with formaldehyde, or for reacting propane or isobutane with oxygen in the presence of ammonia to make the corresponding olefin and the corresponding nitrile, acrylonitrile or methacrylonitrile. Such catalysts are possible catalysts to promote other oxidation reactions.

One of the most effective, efficient and economical modes of carrying out such catalytic reactions is in a fluidized bed of such catalyst, but such operations call for a catalyst that is physically resistant to the abrasive conditions inherent in the fluidized bed reaction mode.

It is a principal object of the present invention to provide a method of making supported vanadium-antimony catalysts having good abrasion resistance.

Other objects, as well as aspects, features, and advantages of the invention will become apparent from a study of the specification, including the specific examples and the claims.

According to the invention there is provided a method of making an active and abrasion resistant catalyst composition comprising at least 5 weight percent alumina support and at most 95 weight percent of a complex oxide composition having the empirical formula:

$$VSb_mA_aH_bC_cO_x,$$

where
A is one or more of W, Sn, Mo, B, P and Ge;
H is one or more of Cu, Ag, Nb, Ta, Ti, Fe, Co, Ni, Cr, Pb, Mn Zn, Se, Te, Ga, In and As;
C is one or more of an alkali metal, alkaline earth metal, and rare earths; and
where m is from 0.01 and up to 20; a is 0-10; b is 0-20; c is 0-20 (usually 0-1); the ratio (a+b+c):(1+m) is 0.01-6; wherein x is determined by the oxidation state of the other elements, which method comprises mixing a hydrosol or gel of boehmite with a slurry or solution containing the other batch materials containing the elements of said formula, and thereafter drying and calcining the resultant solid, usually at a temperature in the range from 550°-800° C.

The catalyst compositions of the invention usually have at least 20 weight percent alumina. They usually do not have more than 85 weight percent alumina.

In this application rare earths means elements 57 through 71. Boehmite means the aluminum oxide-hydroxide having the empirical formula AlO(OH). When used alone (i.e. not in conjunction with pseudoboehmite) the term is inclusive of pseudoboehmite.

Attrition-resistant catalysts are commercially especially important in catalytic processes using a fluidized catalytic bed or a gravity-flowing moving catalytic bed.

We have found that the alumina-supported catalyst made according to the invention has high catalytic activity, superior to making the same empirical catalyst composition supported on alumina prepared with another alumina source or procedure, and that the catalyst so prepared is also attrition-resistant. Other methods of preparation of the alumina-supported catalyst yield an attrition-resistant catalyst having comparatively low catalytic activity, or yield a catalyst having high catalytic activity, but little or no attrition resistance.

In the examples the attrition test referred to was according to the following procedure:

A 5 ml sample of the catalyst (20/35 mesh) is weighed accurately and placed in a 4 oz. round jar with a screw-on lid, along with 35 BB pellets (4.5 mm., Zn-plated steel). The jar is closed and placed on the rollers of a ball mill. It is then rolled for ½ hours. The contents of the jar are then placed on stacked 20/35 mesh screens to remove any pellets and the fines. The material retained on 35 mesh is then weighed. The particle size retention is reported as percent of the original weight.

The hydrosol or gel of boehmite can conveniently be prepared in a known manner by peptization, i.e. acid-catalyzed hydrolytic breakdown of the $[AlO(OH)]_x$ polymer. Nitric acid and organic acids have been commonly used as peptizing agents. In the process, a gel or a colloidal suspension (hydrosol) is formed.

The use of an alumina hydrosol or gel in making catalysts is known in specific instances. For instance, U.S. Pat. No. 2,847,387 discloses using such an alumina source to make catalysts in a general way, but not the present catalysts and not a hydrosol or gel of boehmite. U.S. Pat. No. 4,036,784 peptizes an alpha-alumina monohydrate and uses it to make a hydrotreating catalyst. In U.S. Pat. No. 4,102,821, the pore volume of an alumina made from pseudoboehmite was controlled by treatment with certain organic acids. The solid alumina so prepared was in some instances impregnated with catalytic materials. U.S. Pat. No. 4,558,031 discloses treating "alumina monohydrate (Boehmite)" with water and an acid to form a gel, which can then be dried and calcined to form catalyst or catalyst support.

The following specific examples are merely illustrative and are not to be considered limiting.

EXAMPLE 1

The following catalyst has the empirical formula $VSb_5WO_x$, plus alumina support. It was made as follows:

A dry powder of boehmite (a mixture of boehmite and pseudoboehmite) was used as the $Al_2O_3$ source. It contained boehmite [AlO(OH)] with some water of hydration such that, expressed as $Al_2O_3$, it was about 71% $Al_2O_3$. 35.3 gms were dispersed in 139.9 g of $H_2O$ and 1.4 g of acetic acid and stirred, forming a sol.

In a separate operation 3.24 g $NH_4VO_3$ in about 150 ml of hot water, was added to a stirred flask equipped for reflux. To the hot solution 20.2 g $Sb_2O_3$ was added, and the slurry was boiled under reflux for 16–18 hours overnight, with ammonia evolution. The vanadium-antimony slurry was transferred to a beaker and a solution of 7.50 g ammonium metatungstate in 20–25 ml of water was added, followed by addition of the alumina sol, with continued stirring. After partial evaporation, the mixture became too thick for stirring. It was then transferred to an evaporating dish, and the evaporation, followed by drying overnight, was continued in an oven at 110°–120° C. The dried material was precalcined at 350° C. for 5 hours, screened to 20/35 mesh, then calcined 3 hours at 610° C. In the attrition test 61.0 percent of the catalyst was retained and was thus attrition resistant, comparable to a commercial catalyst used in fluid bed catalytic ammoxidation of propylene.

EXAMPLE 2

The following catalyst has the empirical formula $VSb_5VO_x$, plus alumina support. It was made as follows:

A dry powder of boehmite (a mixture of boehmite and pseudoboehmite) was used as the $Al_2O_3$ source. It contained boehmite [AlO(OH)] with some water of hydration such that, expressed as $Al_2O_3$, it was about 71% $Al_2O_3$. 35.3 gms were dispersed in 134.1 g of $H_2O$ and 7.1 g of acetic acid and stirred until a soft gel formed.

In a separate operation 3.24 g $NH_4VO_3$ in about 150 ml of hot water, was added to a stirred flask equipped for reflux. To the hot solution 20.2 g $Sb_2O_3$ was added, and the slurry was boiled under reflux for 16-18 hours overnight, with ammonia evolution. The vanadium-antimony slurry was transferred to a beaker and a solution of 7.50 g ammonium metatungstate in 20-25 ml of water was added, followed by addition of the alumina sol, with continued stirring. After partial evaporation, the mixture became too thick for stirring. It was then transferred to an evaporating dish, and the evaporation, followed by drying overnight, was continued in an oven at 110°-120° C. The dried material was precalcined at 350° C. for 5 hours, screened to 20/35 mesh, then calcined 16 hours at 610° C. In the attrition test 52.6 percent of the catalyst was retained.

EXAMPLE 3

The following catalyst has the empirical formula $VSb_5WO_x$, plus alumina support. It was made as follows:

A dry powder of boehmite (a mixture of boehmite and pseudoboehmite) was used as the $Al_2O_3$ source. It contained boehmite [AlO(OH)] with some water of hydration such that, expressed as $Al_2O_3$, it was about 71% $Al_2O_3$. 58.8 gms were dispersed in 206 ml of $H_2O$ and 29 g of acetic acid and stirred, forming a sol.

In a separate operation 5.40 g $NH_4VO_3$ in about 150 ml of hot water, was added to a stirred flask equipped for reflux. To the hot solution 33.6 g $Sb_2O_3$ was added, and the slurry was boiled under reflux for 16-18 hours overnight, with ammonia evolution. The vanadium-antimony slurry was transferred to a beaker and a solution of 12.43 g ammonium metatungstate in 20-25 ml of water was added, followed by addition of the alumina sol, with continued stirring. After partial evaporation, the mixture became too thick for stirring. It was then transferred to an evaporating dish, and the evaporation, followed by drying overnight, was continued in an oven at 110-120° C. The dried material was precalcined at 350° C. for 5 hours, screened to 20/35 mesh, then calcined 3 hours at 610° C. In the attrition test 51.7 percent of the catalyst was retained.

EXAMPLE 4

Example 3 was repeated except that the calcination time was 16 hours. In the attrition resistance test 56.7 percent of the catalyst was retained.

EXAMPLE 5

The following catalyst has the empirical formula $VSb_{3.5}P_{2.5}WO_x$, plus alumina support. It was made as follows:

A dry powder of boehmite (a mixture of boehmite and pseudoboehmite) was used as the $Al_2O_3$ source. It contained boehmite [AlO(OH)] with some water of hydration such that, expressed as $Al_2O_3$, it was about 71% $Al_2O_3$. 35.3 gms were dispersed in 127.2 g of $H_2O$ and 14.1 g of acetic acid and stirred, forming a sol.

In a separate operation 4.03 g $NH_4VO_3$ in about 150 ml of hot water, was added to a stirred flask equipped for reflux. To the hot solution 17.58 g $Sb_2O_3$ was added, and the slurry was boiled under reflux for 16-18 hours overnight, with ammonia evolution. The vanadium-antimony slurry was transferred to a beaker and a solution of 9.30 g ammonium metatungstate and 1.14 g $(NH_4)_2HPO_4$ in 20-25 ml of water was added, followed by addition of the alumina gel, with continued stirring. After partial evaporation the mixture became too thick for stirring. It was then transferred to an evaporating dish, and the evaporation, followed by drying overnight, was continued in an oven at 110°-120° C. The dried material was precalcined at 350° C. for 5 hours, screened to 20/35 mesh, then calcined 3 hours at 610° C. The catalyst was hard and attrition-resistant.

EXAMPLE 6

The following catalyst has the empirical formula $VSb_{3.5}WP_{0.75}O_x$, plus alumina support. It was made as follows:

A dry powder of boehmite (a mixture of boehmite and pseudoboehmite) was used as the $Al_2O_3$ source. It contained boehmite [AlO(OH)] with some water of hydration such that, expressed as $Al_2O_3$, it was about 71% $Al_2O_3$. 35.3 gms were dispersed in 127.2 g of $H_2O$ and 14.1 g of acetic acid and stirred, forming a sol.

In a separate operation 3.87 g $NH_4VO_3$ in about 150 ml of hot water, was added to a stirred flask equipped for reflux. To the hot solution 16.90 g $Sb_2O_3$ was added, and the slurry was boiled under reflux for 16-18 hours overnight, with ammonia evolution. The vanadium-antimony slurry was transferred to a beaker and a solution of 8.94 g ammonium metatungstate and 3.28 g $(NH_4)_2HPO_4$ in 20-25 ml of water was added, followed by addition of the alumina gel, with continued stirring. After partial evaporation the mixture became too thick for stirring. It was then transferred to an evaporating dish, and the evaporation, followed by drying overnight, was continued in an oven at 110°-120° C. The dried material was precalcined at 350° C. for 5 hours, screened to 20/35 mesh, then calcined 3 hours at 610° C. The catalyst was hard and attrition-resistant.

EXAMPLE 7

The following catalyst has the empirical formula $VSb_{3.5}WP_{0.5}O_x$, plus alumina support. It was made as follows:

A dry powder of boehmite (a mixture of boehmite and pseudoboehmite) was used as the $Al_2O_3$ source. It contained boehmite [AlO(OH)] with some water of hydration such that, expressed as $Al_2O_3$, it was about 71% $Al_2O_3$. 35.3 gms were dispersed in 127.2g of $H_2O$ and 14.1g of acetic acid and stirred, forming a sol.

In a separate operation 3.81g $NH_4VO_3$ in about 150ml of hot water, was added to a stirred flask equipped for reflux. To the hot solution 16.6g $Sb_2O_3$ was added, and the slurry was boiled under reflux for 16-18 hours overnight, with ammonia evolution. The vanadium-antimony slurry was transferred to a beaker and a solution of 8.80 g ammonium metatungstate and 2.15g $(NH_4)_2HPO_4$ in 20-25 ml of water was added, followed by addition of the alumina gel, with continued stirring. After partial evaporation the mixture became too thick for stirring. It was then transferred to an evaporating dish, and the evaporation, followed by drying overnight, was continued in an oven at 110°-120° C. The dried material was precalcined at 350° C. for 5 hours, screened to 20/35 mesh, then calcined 3 hours at 610° C. The catalyst was hard and attrition-resistant.

EXAMPLE 8

The following catalyst has the empirical formula $VSb_5PWO_x$, plus alumina support. It was made as follows:

5.40g $NH_4VO_3$ in about 150ml of hot water, was added to a stirred flask equipped for reflux. To the hot solution 33.6g $Sb_2O_3$ was added, and the slurry was boiled under reflux for 16-18 hours overnight, with ammonia evolution. The vanadium antimony slurry was transferred to a beaker and a solution of 12.45g ammonium metatungstate in 20-25 ml of water was added, with continued stirring. After partial evaporation the mixture became too thick for stirring. It was then transferred to an evaporating dish, and the evaporation, followed by drying overnight, was continued in an oven at 110°-120° C. It was ground fine and then dry-mixed with a dry powder of boehmite (a mixture of boehmite and pseudoboehmite) having the empirical formula AlO(OH) and containing some water of hydration such that, expressed as $Al_2O_3$, it was about 71% $Al_2O_3$. The mixture was 51.6g of the V-Sb-W ground catalyst and 58.8g of the boehmite powder. The mixture was then treated with 63.7 ml water containing 7.5 ml acetic acid and was dried overnight at 110° to 120° C. and heat treated at 350° C. for 5 hours, followed by screening to 20/35 mesh and calcining for 3 hours at 610° F. The catalyst wa not attrition-resistant, and no catalyst was retained on the 35 mesh screen in the attrition test.

EXAMPLE 9

The following catalyst has the empirical formula $VSb_5WO_x$, plus alumina support. It was made as follows:

10.80g $NH_4VO_3$ in about 150ml of hot water, was added to a stirred flask equipped for reflux. To the hot solution 67.2g $Sb_2O_3$ was added, and the slurry was boiled under reflux for 16-18 hours overnight, with ammonia evolution. The vanadium-antimony slurry was transferred to a beaker and a solution of 24.9g ammonium metatungstate in about 50 ml of water was added, with continued stirring. After partial evaporation the mixture became too thick for stirring. It was then transferred to an evaporating dish, and the evaporation, followed by drying overnight, was continued in an oven at 110°-120° C. The material was ground to a fine powder. The 24 grams was mixed with 240g of a 10 weight percent alumina sol, and the mixture was evaporated with stirring at 85°-95° C., then dried overnight at about 120° C., heat treated for 5 hours, screened to 25/30 mesh and calcined for 3 hours at 610° C. The catalyst was hard and abrasion resistart Performance of the catalysts of the foregoing examples was checked in a vapor phase ammoxidation reaction oi propane at molar feed ratios of propane/$NH_3$/$O_2$/$N_2$/$H_2O$ of 1/2/3/6.6/3/1, using a fixed bed microreactor with a preheat leg immersed in a temperature-controlled molten salt bath. The reaction feed ($C_3$,$NH_3$,$O_2$,$N_2$) was metered through mass flow controllers into a mixing column, then introduced into the bottom of the reactor through the preheat leg. As an additional diluent, water was fed through a septum at the top of preheat leg, using a syringe pump. The catalyst charge was of 20-35 mesh particles in the fixed bed reactor. The reaction temperature was 500° C. The feed ratios are listed with the results in the following Tables. The effluent from the reactor was recovered and ananalyzed, and the amounts of acrylonitrile, propylene, HCN and unreacted propane determined. The results for catalysts of Examples 1-14 are listed in Table I. Since HCN is a valuable co-product of acrylonitrile production, its yields and selectivities are included, as is propylene, since it is readily converted to acrylonitrile.

TABLE 1

| CATALYST OF EXAMPLE NO. | CONTACT TIME SECONDS | PROPANE CONVERSION, % | PERCENT YIELD | | | PERCENT SELECTIVITY | | |
|---|---|---|---|---|---|---|---|---|
| | | | AN | HCN | $C_3=$ | AN | HCN | $C_3=$ |
| 1 | 1.1 | 78.4 | 27.3 | 9.6 | 5.4 | 34.8 | 12.3 | 6.9 |
| 2 | 1.1 | 80.0 | 27.4 | 9.7 | 4.6 | 34.3 | 12.1 | 5.8 |
| 3 | 1.1 | 81.2 | 29.3 | 8.3 | 4.4 | 36.0 | 10.2 | 5.5 |
| 4 | 1.1 | 76.1 | 29.0 | 4.4 | 4.7 | 38.1 | 10.1 | 4.6 |
| 5 | 1.4 | 87.2 | 30.2 | 8.8 | 4.0 | 34.7 | 10.1 | 4.6 |
| 6 | 1.5 | 85.0 | 31.6 | 9.1 | 4.3 | 37.2 | 10.8 | 5.0 |
| 7 | 1.7 | 81.9 | 30.2 | 9.7 | 4.9 | 36.9 | 11.8 | 6.0 |
| 8 | 1.8 | 77.6 | 31.2 | 9.9 | 5.1 | 36.3 | 12.7 | 8.5 |
| 9 | 1.7 | 38.1 | 14.1 | 6.1 | 3.8 | | | |

As will be evident to those skilled in the art, various modifications of this invention can be made or followed in the light of the foregoing disclosure and discussion without departing from the spirit and scope of the disclosure or from the scope of the claims.

We claim:

1. A method of making an active and abrasion resistant catalyst composition comprising at least 5 weight percent alumina support and at most 95 percent of a complex oxide composition having the empirical formula:

$$VSb_mA_aH_bC_cO_x,$$

where

A is one or more of W, Sn, Mo, B, P and Ge;

H is one or more of Cu, Ag, Nb, Ta, Ti, Fe, Co, Ni, Cr, Pb, Mn Zn, Se, Te, Ga, In and As;

C is one or more of an alkali metal, alkaline earth metal, and rare earths; and where m is from 0.01 and up to 20; a is 0-10; b is 0-20; c is 0-20; the ratio (a+b+c):(1+m) is 0.01-6; wherein x is determined by the oxidation state of the other elements, which method comprises mixing a hydrosol or gel of boehmite with a slurry or solution containing the other batch materials containing the elements of said formula, and thereafter drying and calcining the resultant solid.

2. A method of claim 1 wherein the calcination is effected in the temperature range from 550°–800° C.

3. A method of claim 1 wherein the catalyst composition is at least 20 weight percent alumina.

4. A method of claim 3 wherein the catalyst composition is no more than 85 weight percent alumina.

5. A method of claim 2 wherein the catalyst composition is at least 20 weight percent alumina.

6. A method of claim 5 wherein the catalyst composition is no more than 85 weight percent alumina.

7. A method of making an active and abrasion resistant catalyst composition comprising at least 5 weight percent alumina support and at most 95 percent of a complex oxide composition having the empirical formula:

$$VSb_mA_aH_bC_cO_x,$$

where
- A is one or more of V, Sn, Mo, B, P and Ge;
- H is one or more of Cu, Ag, Nb, Ta, Ti, Fe, Co, Ni, Cr, Pb, Mn Zn, Se, Te, Ga, In and As;
- C is one or more of an alkali metal, alkaline earth metal, and rare earths; and where m is from 0.01 and up to 20; a is 0–10; b is 0–20; c is 0–1; the ratio $(a+b+c):(1+m)$ is 0.01–6; wherein x is determined by the oxidation state of the other elements, which method comprises mixing a hydrosol or gel of boehmite with a slurry or solution containing the other batch materials containing the elements of said formula, and thereafter drying and calcining the resultant solid.

* * * * *

UNITED STATES PATENT AND TRADEMARK OFFICE
CERTIFICATE OF CORRECTION

PATENT NO. : 4,797,381
DATED : January 10, 1989
INVENTOR(S) : Joseph P. Bartek et al.

It is certified that error appears in the above-identified patent and that said Letters Patent is hereby corrected as shown below:

On the title page, Item (75) delete ",both" and insert therefor --; James F. Brazdil, Jr., Mayfield Village, all --.

Column 8, line 4, "V" should read -- W --.

Signed and Sealed this

Fourteenth Day of March, 1989

Attest:

DONALD J. QUIGG

*Attesting Officer*    *Commissioner of Patents and Trademarks*